Nov. 7, 1933.　　　　J. D. LANGDON　　　　1,934,545

FLUSH VALVE

Filed April 16, 1929

Inventor:
J. D. Langdon
By 
Attorney.

Patented Nov. 7, 1933

1,934,545

UNITED STATES PATENT OFFICE 1,934,545

FLUSH VALVE

Jesse D. Langdon, Los Angeles, Calif.

Application April 16, 1929. Serial No. 355,630

2 Claims. (Cl. 137—93)

The present invention relates to flush valves, and aims to provide a novel and improved valve of that kind which will operate efficiently.

Another object is the provision of a flush valve comprising a novel assembly of the component elements to provide a simple and effective construction.

A further object is to provide a flush valve which will not jam or bind, especially when the valve is opened after the water has drained therefrom and is displaced by air so that the valve will operate with a quicker action when opened.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1:
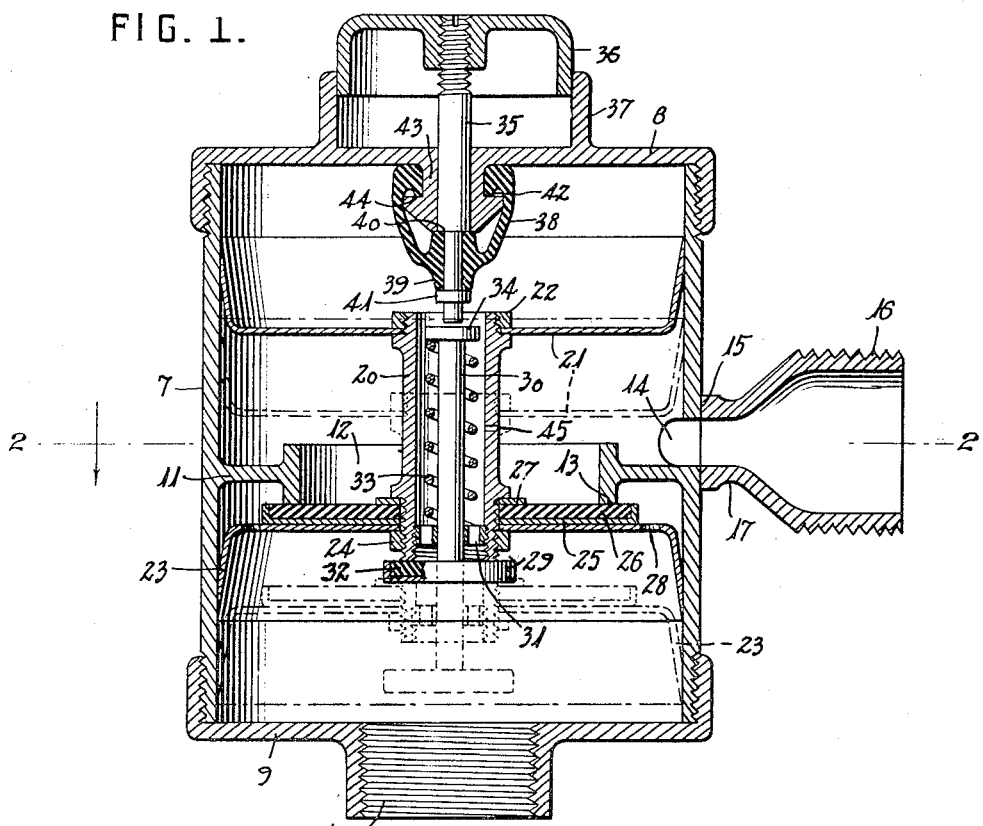
Figure 1 is a diametrical section of the improved valve.
Figure 2:
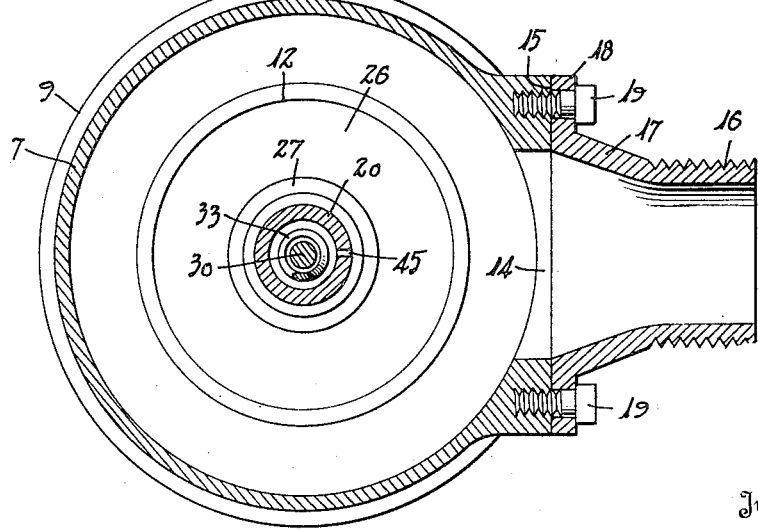
Fig. 2 is a section on the line 2—2 of Fig. 1.
Figure 2:

The casing has a cylindrical body 7 and removable top and bottom caps 8 and 9, respectively, the lower cap having a water inlet 10 to which the water supply pipe is connected.

The casing has a partition 11 therein provided with a port 12 and a depending surrounding valve seat 13.

The body 7 has an outlet 14 immediately above the partition 11, and said outlet is of elongated or slot shape so as to be of small height, but of sufficient area for the full discharge of water. The body has an abutment 15 surrounding the outlet 14, and an outlet nipple 16 has an elongated attaching portion 17 with a flange 18 to bear against the abutment 15. Clamping screws 19 pass through the flange 18 and are threaded into the abutment 15. The nipple 16 may be detached and replaced by nipples of different sizes or diameters, and thus provides an adapter for connecting the discharge pipe with the valve body.

A tubular stem 20 passes through the port 12, and a piston 21 is clamped on a shoulder of said stem at the upper end thereof by a collar or nut 22.

A similar piston 23 is fitted on the lower terminal of the stem and is held in place by a collar or nut 24 threaded on the stem.

The pistons 21 and 23 are of the kind disclosed in my application Serial No. 305,150, filed Dec. 11, 1928, issued as Patent No. 1,757,016 of May 6, 1930, and their rims are turned away from one another and slidably contact with the body 7 above and below the partition 11, thereby guiding the stem 20 for axial movement in the casing.

A metal disk 25 is seated on the piston 23, and a rubber or other suitable gasket 26 is seated on said disk to contact with the seat 13, so as to provide a valve member for closing the port 12. A washer 27 is disposed between the gasket 26 and a shoulder of the stem 20, said washer 27, gasket 26, disk 25 and piston 23 being clamped between the shoulder of the stem and the nut 24.

The piston 23 has apertures 28 surrounding the disk 25 to permit the water to flow through the piston when the valve member is moved open.

A relief valve member 29 has an upstanding stem 30 slidable through a spider or guide 31 secured in the stem 20, and a gasket 32 is fitted in the member 29 to seat against the lower end of the stem, thereby closing the passage of said stem. The valve member 29 is normally closed by a coiled spring 33 surrounding the stem 30 and confined between the spider 31 and a flange 34 on said stem 30.

A plunger 35 is slidable in the cap 8 and is screw-threaded within a push button 36 which is slidable in an upstanding guide 37 rising from the cap 8, and the lower end of the plunger is adapted to contact with the stem 30 for moving the valve member 29 open.

Leakage past the plunger 35 is prevented by means of an elastic sleeve 38 having a cuff 39 at its lower end embracing the plunger 35 and confined between the shoulder 40 and a collar 41 on said plunger. The upper end of the sleeve 38 has a cuff 42 embracing a guide neck 43 for the plunger which depends from the cap 8, said cuff having a downwardly extending edge portion seating against a shoulder 44 of the neck 43.

The sleeve 38 in embracing the plunger 35 and neck 43 will prevent the escape of water, and said sleeve is stretched when the plunger is depressed.

In operation, when the push button 36 is depressed, it contacts with the stem 30 and moves the relief valve member 29 open, thereby permitting the water to flow upwardly through the tubular stem 20 into the chamber above the piston 21, thereby moving the piston and valve unit downwardly in the casing, to open the main valve member 25—26. The push button 36 is adjustable on the plunger 35 in order to regulate the downward movement of the valve member 29 and thereby control the opening movement of the valve.

This enables the volume of water discharged to be regulated. When the push button 36 is released, the valve member 29 is seated by the spring 33, thereby shutting off the flow of water into the chamber above the piston 21, and the water in said chamber and within the stem 20 may drain out through the restricted aperture 45 in the stem 20 to the outlet 14, so that the pressure against the piston 23 and valve member will gradually close the valve member.

The ports are so arranged that when the piston and valve unit moves downwardly, the piston 21 approaches the partition 11 and comes sufficiently close to the port 12, before the piston 23 contacts with the cap or bottom 9 of the casing, to receive the impact of the fluid flowing upwardly through the port 12, and to balance the pressures above and below the partition 11. This downward movement of the piston 21 close to the partition 11 is permitted by the small height of the outlet 14, said outlet being extended horizontally to have the desired area, and although the piston 21 comes close to the port 12 it does not obstruct the outlet 14 so that the full discharge of fluid is permitted.

This arrangement is especially of advantage when the water is drained from the valve and is displaced by air, so as to cause a sudden downward movement of the piston and valve unit when the relief valve member 29 is opened. This, in flush valves heretofore used, frequently causes the movable member to jam or bind so as to render the valve inoperative. However, with the present arrangement, when the piston 21 moves down close to the port 12, before the piston 23 contacts with the cap 9, the fluid pressure against the lower surface of the piston 21 becomes sufficiently great, to arrest the downward movement of the piston, without obstructing the outlet 14, so that the piston unit will not stick or bind.

Having thus described the invention, what is claimed as new is:

1. A valve of the character described comprising a cylindrical casing having removable caps at opposite ends and a port of reduced diameter between its ends, one cap having an inlet, the casing having an outlet at that side of said port opposite to said inlet, a piston working in the casing between said port and the other cap, a piston working in the casing between said port and inlet, said pistons consisting of substantially rigid cups having flared rims extending away from one another toward said caps with the marginal portions of said rims contacting slidably with the wall of the casing, a tube extending through said pistons and having means thereon securing the pistons thereto, said tube having a restricted drain aperture intermediate said pistons, a valve disk secured to the second named piston and seatable across said port away from said inlet, the second named piston having openings between the edge of said valve disk and the rim of said piston, a spring pressed valve member carried by said tube and disposed within the cupped portion of the second named piston, and means for simultaneously moving said pistons to open said port and open said valve member.

2. A valve of the character described comprising a casing having a port of reduced diameter between its ends, the casing having an inlet at one end and an outlet in its wall at that side of said port opposite to said inlet, a piston working in the casing between said port and the other end of the casing, a piston working in the casing between said port and inlet, a tube connecting said pistons, a valve portion on the second named piston and seatable across said port away from said inlet, the second named piston having openings between said valve portion and the rim of said piston, a valve member carried by said tube for closing it, and means for opening said valve member, said means comprising a depressible plunger slidable in the casing, and a rubber sleeve surrounding the end of the plunger and an extension on the casing surrounding the plunger to serve as a fluid seal for said plunger.

JESSE D. LANGDON.